(12) United States Patent
Liang et al.

(10) Patent No.: US 7,205,355 B2
(45) Date of Patent: Apr. 17, 2007

(54) COMPOSITION AND PROCESS FOR THE MANUFACTURE OF AN IMPROVED ELECTROPHORETIC DISPLAY

(75) Inventors: Rong-Chang Liang, Cupertino, CA (US); HongMei Zang, Sunnyvale, CA (US); Xiaojia Wang, Fremont, CA (US)

(73) Assignee: SiPix Imaging, Inc., Fremont, CA (US)

( * ) Notice: Subject to any disclaimer, the term of this patent is extended or adjusted under 35 U.S.C. 154(b) by 631 days.

(21) Appl. No.: 10/310,681

(22) Filed: Dec. 4, 2002

(65) Prior Publication Data

US 2003/0176557 A1 Sep. 18, 2003

Related U.S. Application Data

(63) Continuation-in-part of application No. 09/874,391, filed on Jun. 4, 2001, now abandoned.

(51) Int. Cl.
*C08K 5/01* (2006.01)
(52) U.S. Cl. .................. 524/474; 345/107; 359/316
(58) Field of Classification Search .............. 524/474; 345/107; 359/316
See application file for complete search history.

(56) References Cited

U.S. PATENT DOCUMENTS

| | | | |
|---|---|---|---|
| 3,612,758 A | 10/1971 | Evans et al. | |
| 3,668,106 A | 6/1972 | Ota | |
| 4,071,430 A | 1/1978 | Liebert | |
| 4,093,534 A | 6/1978 | Carter et al. | |
| 4,285,801 A | 8/1981 | Chiang | |
| 4,411,115 A | 10/1983 | Marzouki et al. | |
| 4,680,103 A | 7/1987 | Beilin Solomon I. et al. | |
| 4,741,988 A | 5/1988 | Van der Zande et al. | |
| 5,234,987 A | 8/1993 | Hubbard et al. | |
| 5,276,438 A | 1/1994 | DiSanto et al. | |
| 5,279,511 A | 1/1994 | DiSanto et al. | |
| 5,380,362 A | 1/1995 | Schubert | |
| 5,403,518 A | 4/1995 | Schubert | |
| 5,573,711 A | 11/1996 | Hou et al. | |
| 5,589,100 A | 12/1996 | Grasso et al. | |
| 5,699,097 A | 12/1997 | Takayama et al. | |
| 5,914,806 A | 6/1999 | Gordon II et al. | |
| 5,930,026 A | 7/1999 | Jacobson et al. | |
| 5,932,648 A | 8/1999 | Troska et al. | |
| 5,961,804 A | 10/1999 | Jacobson et al. | |
| 5,993,900 A | 11/1999 | Hansen et al. | |
| 6,017,584 A | 1/2000 | Albert et al. | |
| 6,067,185 A | 5/2000 | Albert et al. | |
| 6,113,810 A | 9/2000 | Hou et al. | |
| 6,120,588 A | 9/2000 | Jacobson | |
| 6,120,839 A | 9/2000 | Comiskey | |
| 6,172,798 B1 | 1/2001 | Albert et al. | |
| 6,184,856 B1 | 2/2001 | Gordon, II et al. | |
| 6,312,304 B1 | 11/2001 | Duthaler et al. | |
| 6,327,072 B1 | 12/2001 | Comiskey et al. | |
| 6,337,761 B1 | 1/2002 | Rogers et al. | |
| 6,392,786 B1 | 5/2002 | Albert | |
| 6,400,492 B1 | 6/2002 | Morita et al. | |
| 6,750,844 B2 | 6/2004 | Nakanishi | |
| 6,751,007 B2 | 6/2004 | Liang et al. | |
| 6,788,449 B2 | 9/2004 | Liang et al. | |
| 6,795,229 B2 | 9/2004 | Liang et al. | |
| 6,850,355 B2 | 2/2005 | Liang et al. | |
| 2002/0018043 A1 | 2/2002 | Nakanishi | |
| 2002/0075556 A1 | 6/2002 | Liang et al. | 359/296 |
| 2002/0126249 A1 | 9/2002 | Liang et al. | 349/187 |
| 2002/0182544 A1 | 12/2002 | Chan-Park et al. | 430/311 |
| 2002/0196525 A1 | 12/2002 | Chen et al. | 359/296 |
| 2003/0176557 A1 | 9/2003 | Liang et al. | |

FOREIGN PATENT DOCUMENTS

| | | |
|---|---|---|
| EP | 0 468 593 | 1/1992 |
| EP | 1 089 118 A2 | 4/2001 |
| JP | 59-171930 | 9/1984 |
| WO | WO 99/56171 | 11/1999 |
| WO | WO 00/60410 | 10/2000 |
| WO | WO 01/67170 A1 | 9/2001 |
| WO | WO 02/056097 | 7/2002 |

OTHER PUBLICATIONS

U.S. Appl. No. 09/518,488, filed Mar. 3, 2000.
U.S. Appl. No. 09/606,654, filed Jun. 28, 2000.
U.S. Appl. No. 60/315,647, filed Aug. 28, 2001.
U.S. Appl. No. 60/367,325, filed Mar. 21, 2002.
U.S. Appl. No. 60/375,299, filed Apr. 23, 2002.
ExxonMobil Chemical, << Datasheet Isopar E >>, XP-002273408, retrieved from the internet: <URL :http://www.exxonmobilchemical.com/Public_Files/Fluids/Aliphatics/Europe/Data_Sheet_Isopar_Fluid_E.pdf>, retrieved on May 25, 2004.
Liang, R.C., Hou, J., & Zang, H.M. (Dec. 2002) Microcup Electrophoretic Displays by Roll-to-Roll Manufacturing Processes. *IDW*, EP2-2, 1337-1340.
Nikkei Microdives. (Dec. 2002) Newly-Developed Color Electronic Paper Promises—Unbeatable Production Efficiency. *Nikkei Microdevices*, 3. (in Japanese, with English translation).
Cominsky, B. et al., "An Electrophoretic Ink For All-Printed Reflective Electronic Displays", *Letters to Nature*, pp. 253-255 (1998).
Chan-Park, M., et al., "Process for Roll-to-Roll Manufacture of a Display by Synchronized Photolithographic Exposure on a Substrate Web", U.S. Appl. No. 09/784,972, filed Feb. 15, 2001.
Dalisa, A. L., "Electrophoretic Display Technology", *IEEE Trans. Electron Devices*—24:827-834 (1977).

(Continued)

*Primary Examiner*—Edward J. Cain
(74) *Attorney, Agent, or Firm*—Howrey LLP

(57) ABSTRACT

The invention relates to a display having improved contrast ratio, switching performance, reflectivity at the Dmin state and structural integrity and methods for its manufacture.

56 Claims, 7 Drawing Sheets

OTHER PUBLICATIONS

Harvey, T.G., "Replication Techniques for Micro-Optics," *SPIE Proc.—3099*:76-82 (1997).

Hopper, M.A., et al., "An Electrophoretic Display, its Properties, Model, and Addressing", *IEEE Trans. Electr. Dev.—26*(8):1148-1152 (1979).

Legge, N.R., et al., "Thermoplastic Elastomers", *Hanser Publishers*—(1987).

Lewis, J.C., et al., "Gravitational, Inter-Particle-Electrode Forces in Electrophoretic Display", Proceedings of the S.I.D., vol. 18/3&4 (1977).

Murau, P., et al., "The Understanding and Elimination of Some Suspension Instabilities in an Electrophoretic Display", *J. App. Phys.—49*(9):4820-4829 (1978).

Nakamura, E., et al., "Development of Electrophoretic Display Using Microcapsulated Suspension", *SID Digest*, (1998), pp. 1014-1017.

Singer, B. and Dalisa, A.L., "An X-Y Addressable Electrophoretic Display", *Proceeding of the S.I.D.*, vol. 18/3&4, (1977).

Slafer, W.D., "Continuous Manufacturing of Thin Cover Sheet Optical Media", *SPIE Proc.—1663*:324-334 (1992).

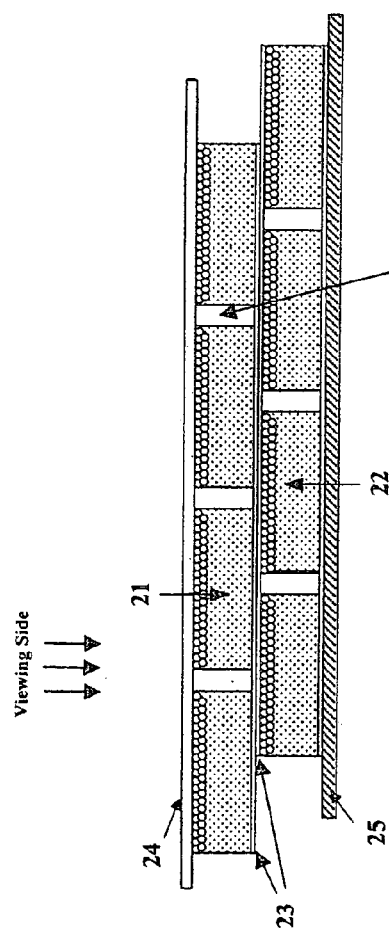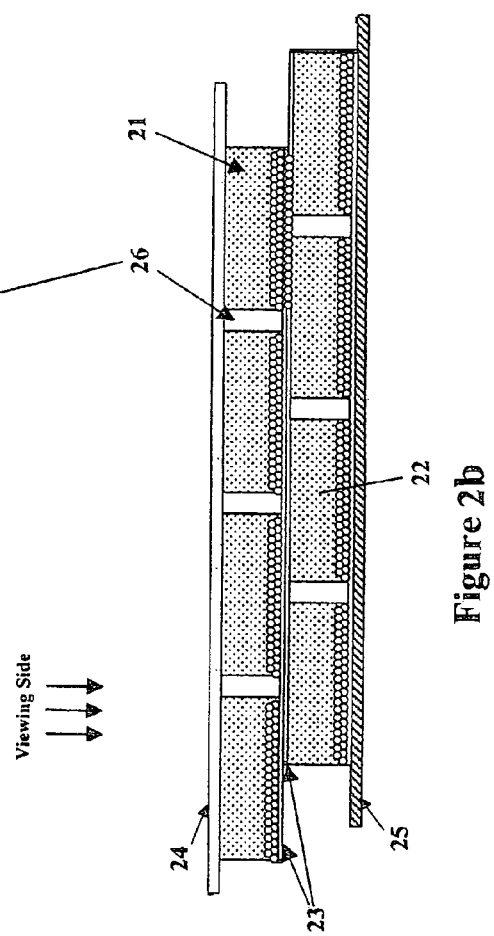

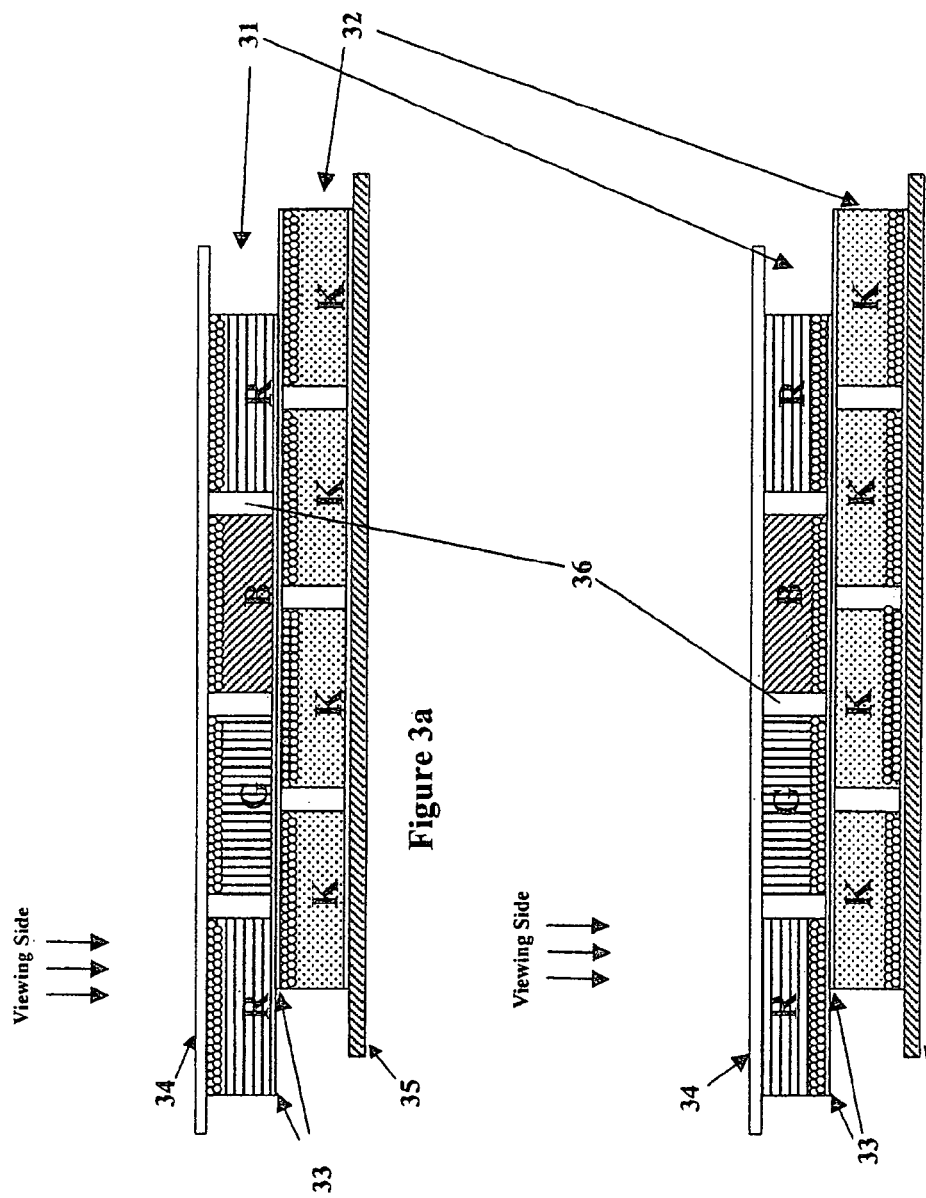

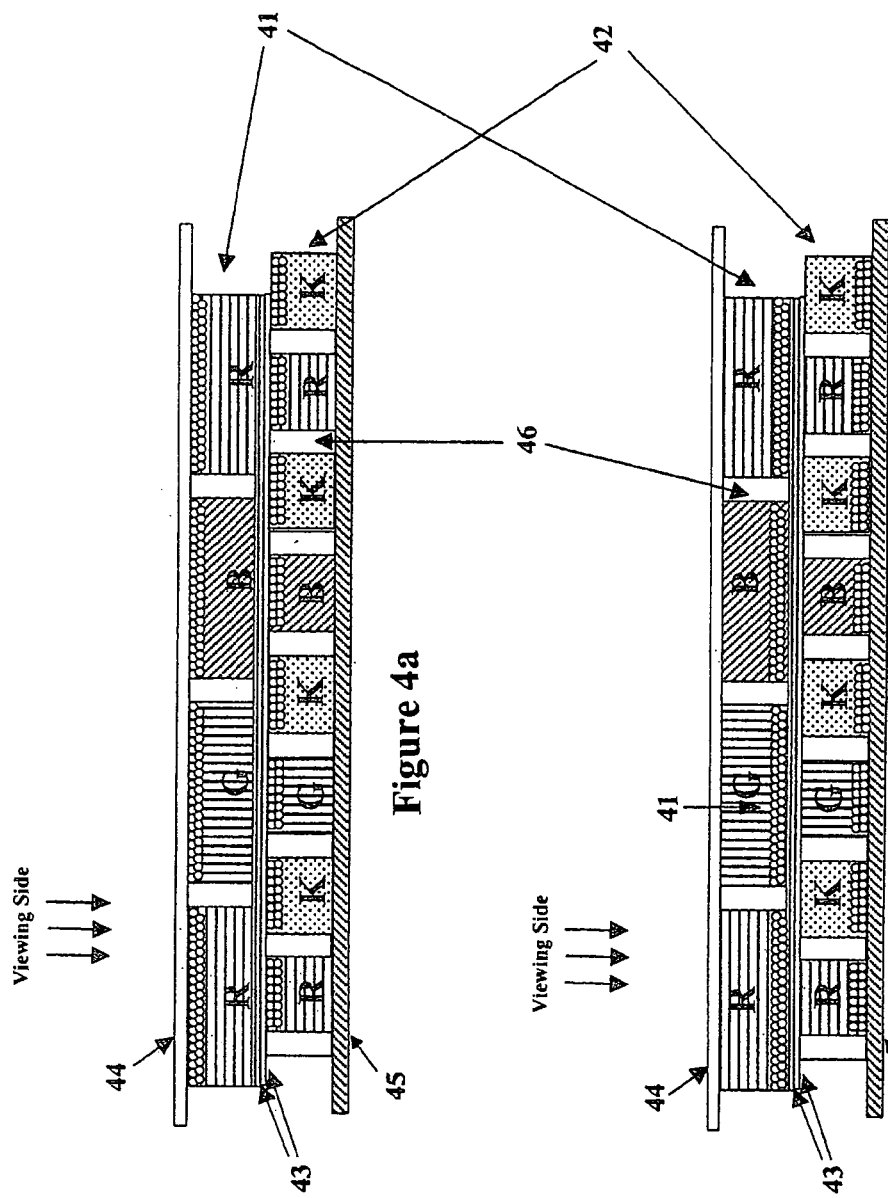

COMPOSITION AND PROCESS FOR THE MANUFACTURE OF AN IMPROVED ELECTROPHORETIC DISPLAY

RELATED APPLICATION

This application is a continuation-in-part of U.S. Ser. No. 09/874,391 filed on Jun. 4, 2001 now abandoned, the content of which is incorporated by reference in its entirety.

BACKGROUND

The electrophoretic display is a non-emissive device based on the electrophoresis phenomenon of charged pigment particles in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

In order to prevent undesired movement of the particles, such as sedimentation, partitions between the two electrodes were proposed for dividing the space into smaller cells (see M. A. Hopper and V. Novotny, IEEE Trans. Electr. Dev., 26(8):1148–1152 (1979)). However, in the case of partition-type electrophoretic displays, difficulties were encountered in the formation of the partitions and the process of enclosing the suspension. Furthermore, it was also difficult to keep suspensions of different colors separate from each other in the partition-type electrophoretic display.

Another type of EPD (see U.S. Pat. No. 3,612,758) has electrophoretic cells that are formed from parallel line reservoirs (the channel or groove type). The filling and sealing of the electrophoretic fluid in the channels are accomplished by a batch-wise process. In addition, the problem of undesirable particle movement or sedimentation, particularly in the longitude direction, remains an issue.

Subsequently, attempts were made to enclose the suspension in microcapsules. U.S. Pat. Nos. 5,961,804, 5,930,026 and 6,017,584 describe microencapsulated electrophoretic displays. The microcapsule type display has a substantially two dimensional arrangement of microcapsules each having therein an electrophoretic composition of a dielectric fluid and a suspension of charged pigment particles that visually contrast with the dielectric solvent. The microcapsules can be formed by interfacial polymerization, in-situ polymerization or other known methods such as physical processes, in-liquid curing or simple/complex coacervation. The microcapsules, after their formation, may be injected into a cell housing two spaced-apart electrodes, or "printed" onto or coated on a transparent conductor film. The microcapsules may also be immobilized within a transparent matrix or binder that is itself sandwiched between the two electrodes.

The electrophoretic displays prepared by these prior art processes, in particular, the microencapsulation process as disclosed in U.S. Pat. Nos. 5,961,804, 5,930,026 and 6,017, 584, have many shortcomings. For example, the electrophoretic display manufactured by the microencapsulation process suffers from sensitivity to environmental changes (in particular, sensitivity to moisture and temperature) due to the wall chemistry of the microcapsules. Secondly, the electrophoretic display based on the microcapsules has poor scratch resistance due to the thin wall and large particle size of the microcapsules. To improve the handleability of the display, microcapsules are embedded in a large quantity of polymer matrix which results in a slow response time due to the large distance between the two electrodes and a low contrast ratio due to the low payload of pigment particles. It is also difficult to increase the surface charge density on the pigment particles because charge-controlling agents tend to diffuse to the water/oil interface during the microencapsulation process. The low charge density or zeta potential of the pigment particles in the microcapsules also results in a slow response rate. Furthermore, because of the large particle size and broad size distribution of the microcapsules, the prior art electrophoretic display of this type has poor resolution and addressability for color applications.

An improved EPD technology was recently disclosed in co-pending applications, U.S. Ser. No. 09/518,488 filed on Mar. 3, 2000 (corresponding to WO 01/67170), U.S. Ser. No. 09/759,212 filed on Jan. 11, 2001 (corresponding to WO 02/56097), U.S. Ser. No. 09/606,654 filed on Jun. 28, 2000 (corresponding to WO 02/01280) and U.S. Ser. No. 09/784,972 filed on Feb. 15, 2001 (corresponding to WO 02/65215), all of which are incorporated herein by reference. The improved EPD comprises isolated cells formed from microcups of well-defined shape, size and aspect ratio and filled with charged pigment or pigment-containing particles dispersed in a dielectric solvent, preferably a fluorinated solvent or solvent mixture. The filled cells are individually sealed with a polymeric sealing layer, preferably formed from a composition comprising a material selected from a group consisting of thermoplastics, thermosets and their precursors.

The microcup structure enables a format flexible and efficient roll-to-roll continuous manufacturing process for the preparation of EPDs. The displays can be prepared on a continuous web of a conductor film such as ITO/PET by, for example, (1) coating a radiation curable composition onto the ITO/PET film, (2) forming the microcup structure by a microembossing or photolithographic method, (3) filling the electrophoretic fluid into the microcups and sealing the filled microcups, (4) laminating the sealed microcups with the other conductor film and (5) slicing and cutting the display to a desirable size or format for assembling.

The sealing of the microcups after they are filled with a dispersion of charged pigment particles in a dielectric fluid can be accomplished by overcoating the electrophoretic fluid with a solution containing the sealing composition. To reduce or eliminate the degree of intermixing during and after the overcoating process, it is highly advantageous to use a sealing composition that is immiscible with the electrophoretic fluid and preferably has a specific gravity no greater than the dielectric fluid. The sealing is then accomplished by hardening the sealing composition by solvent evaporation, interfacial reaction, moisture, heat, radiation or a combination thereof to form a seamless polymeric sealing layer on the electrophoretic fluid. The process as described is the two-pass sealing method.

Alternatively, the sealing can be accomplished by a one-pass method involving first dispersing a sealing composition in the electrophoretic fluid before the filling step. The sealing composition is immiscible with the dielectric solvent and has a specific gravity no greater than that of the solvent and the pigment particles. After filling, the sealing composition phase separates from the electrophoretic fluid and forms a supernatant layer on top of the fluid. The sealing of the microcups is then conveniently accomplished by hardening the precursor layer by solvent evaporation, interfacial reaction, moisture, heat or radiation. UV radiation is the preferred method to seal the microcups, although a combination of two or more curing mechanisms as described above may be used to increase the throughput of sealing.

One advantage of this type of EPD is that the microcup wall is in fact a built-in spacer to keep the top and bottom substrates apart at a fixed distance. The mechanical properties and structural integrity of microcup displays are significantly better than any prior art displays including those manufactured by using spacer particles. In addition, displays involving microcups have desirable mechanical properties including reliable display performance when the display is bent, rolled or under compression pressure from, for example, a touch screen application. The use of the microcup technology also eliminates the need of an edge seal adhesive which would limit and predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup technology is enclosed and isolated in each cell. The microcup display may be cut to almost any dimensions without the risk of damaging the display performance due to the loss of display fluid in the active areas. In other words, the microcup structure enables a format flexible display manufacturing process, wherein the process produces a continuous output of displays in a large sheet format which can be cut into any desired format and size. The isolated microcup or cell structure is particularly important when cells are filled with fluids of different specific properties such as colors and switching rates. Without the microcup structure, it will be very difficult to prevent the fluids in adjacent areas from intermixing or being subject to cross-talk during operation.

In order to achieve a higher contrast ratio, one of two approaches may be taken: (1) using a darkened background to reduce the light leaking through the inactive partition wall or (2) using a microcup of wider opening and narrower partition to increase the payload. However, the darkened background typically results in a lower reflectivity at the Dmin state. On the other hand, display cells formed from wider microcups and narrower partition walls tend to have a poor resistance against compression and/or shear forces imposed by, for example, a sharp stylus for a touch screen panel. Moreover, the use of high payload cells increases not only the degree of difficulty in manufacturing but also the cost of manufacturing.

Substructures within microcup have been disclosed in a copending patent application, U.S. Ser. No. 60/315,647 filed on Aug. 28, 2001, to improve the mechanical properties and image uniformity of displays made from microcups having wide openings and narrow partition walls. However, the manufacturing of such microcups with substructures is very costly and more importantly, the trade-off between contrast ratio and reflectivity at the Dmin state remains unresolved.

SUMMARY OF THE INVENTION

The present invention is directed to a multilayer display having improved contrast ratio, switching performance, reflectivity at the Dmin state and structural integrity, and its manufacture.

The first aspect of the invention is directed to a multiplayer display wherein the display cells are sealed by a sealing composition comprising the following ingredients:

(1) a solvent or solvent mixture which is immiscible with the display fluid in the microcups and exhibits a specific gravity no greater than that of the display fluid; and (2) a thermoplastic elastomer.

The second aspect of the invention is directed to methods for the preparation of the multilayer displays.

The display cells of the multiplayer display of the present invention may be sealed seamlessly and free of defects by a continuous web process using the sealing composition.

The sealing composition also has many other advantages. For example, it also exhibits good wetting properties over the filled microcups throughout the coating process and develops good film integrity over the display fluid even before the solvent evaporates completely. As a result, the integrity of the coating is maintained and no dewetting or beading on the electrophoretic fluid is observed. In addition, the composition enables the continuous sealing of wider microcups, particularly those having a width greater than 100 microns. Furthermore, the sealing composition enables the formation of a sealing layer less than 3 micron thick which is typically difficult to achieve by using traditional sealing compositions. The thinner sealing layer shortens the distance between the top and bottom electrodes resulting in a faster switching rate.

As taught in the copending patent applications U.S. Ser. No. 09/518,488 filed on Mar. 3, 2000 (corresponding to WO 01/67170), U.S. Ser. No. 09/759,212 filed on Jan. 11, 2001 (corresponding to WO 02/56097); U.S. Ser. No. 09/606,654 filed on Jun. 28, 2000 (corresponding to WO 02/01281); U.S. Ser. No. 09/784,972 filed on Feb. 15, 2001 (corresponding to WO 02/65215); and U.S. Ser. No. 09/879,408 filed on Jun. 11, 2001, the sealing composition may be predispersed in the electrophoretic fluid, filled in the microcups to form a seamless sealing layer in a one-pass sealing process. In this case, the sealing composition may be in-line blended with the electrophoretic fluid immediately before the one pass filling and sealing process. The sealing composition may also be applied by the two-pass sealing method.

BRIEF DESCRIPTION OF THE DRAWINGS

FIGS. 2a and 2b show the "on" (Dmin) and "off" (Dmax) states, respectively, of a two-layer electrophoretic display.

FIGS. 3a and 3b show a two-layer color electrophoretic display wherein the top layer comprises microcups filled with red, green and blue electrophoretic fluids and the bottom layer comprises microcups filled with a black electrophoretic fluid.

FIGS. 4a and 4b show a two-layer full color electrophoretic display wherein the top layer comprises microcups filled with red, green and blue electrophoretic fluids and the bottom layer comprises microcups filled with red, green, blue and black electrophoretic fluid. The red, green, blue and inactive partition areas of the upper layer are overlapped with registration to the red, green, blue and black microcups of the lower layer, respectively.

FIG. 5a shows a process of preparing a two-layer electrophoretic display by laminating two microcup layers with the sealing sides of the microcups facing each other. FIG. 5b shows another process of preparing a two-layer electrophoretic display by (i) transferring a microcup layer from a release substrate onto a second microcup layer on a conductor film and (ii) laminating the resultant composite film onto a conductor film, optionally with an adhesive. The process (i) may be repeated to prepare an electrophoretic display having more than two layers of display cells.

FIG. 6a is the groove type, 6b is the groove type with substructure and 6c is the grid type.

All of the display cells referred to above, in the context of the present application, are sealed by either the one-pass or two-pass process with a composition comprising:

(a) a solvent or solvent mixture which is immiscible with the display fluid in the microcups and exhibits a specific gravity no greater than that of the display fluid; and (b) a thermoplastic elastomer.

DETAILED DESCRIPTION OF THE INVENTION

I. Definitions

Unless defined otherwise in this specification, all technical terms are used herein according to their conventional definitions as they are commonly used and understood by those of ordinary skill in the art.

The term "microcup" refers to the cup-like indentations, which may be created by methods such as microembossing, photolithography (as disclosed in WO 01/67170) or pre-punched holes (as disclosed in U.S. Ser. No. 09/942,532 published under U.S. Publication No. 2002-75556).

The term "cell", in the context of the present invention, is intended to mean the single unit formed from a sealed microcup. The cells are filled with charged pigment particles dispersed in a solvent or solvent mixture. The electrophoretic fluid may also be replaced by a suitable liquid crystal composition having the ordinary refractive index matched to that of the isotropic cup material. In the "on" state, the liquid crystal in the microcups is aligned to the field direction and is transparent. In the "off" state, the liquid crystal is not aligned and scatters light. To maximize the light scattering effect of a liquid crystal display, the diameter of the microcups is typically in the range of 0.5–10 microns.

The term "well-defined", when describing the microcups or cells, is intended to indicate that the microcup or cell has a definite shape, size, pattern and aspect ratio which are pre-determined according to the specific parameters of the manufacturing process.

The term "aspect ratio" is a commonly known term in the art and is the depth to width ratio or the depth to diameter ratio of the microcup opening.

The term "Dmax" refers to the maximum achievable optical density of the display.

The term "Dmin" refers to the minimum optical density of the display background.

The term "contrast ratio" is defined as the ratio of the % reflectance of an electrophoretic display at the Dmin state to the % reflectance of the display at the Dmax state.

II. The Multilayer Display

Figure 1:
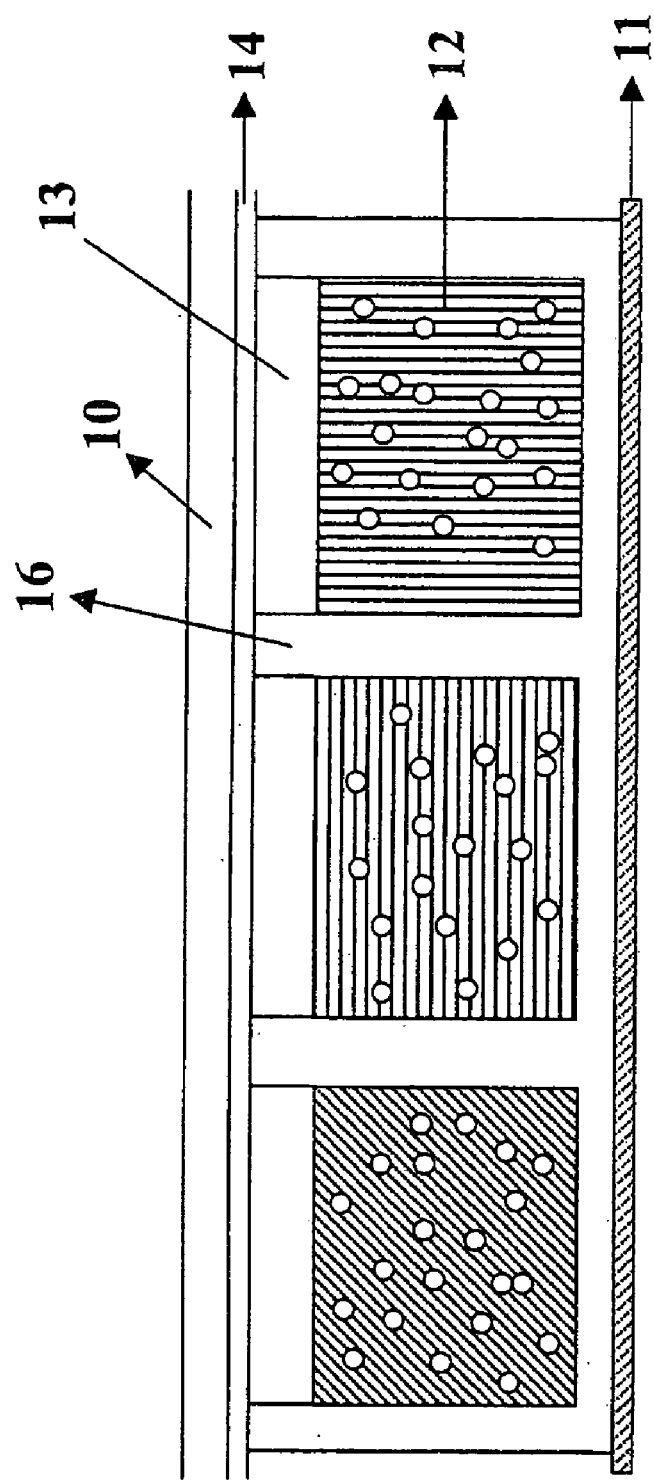
FIG. 1 shows a typical display cell prepared by the microcup technology with a darkened background to improve the contrast ratio.

Electrophoretic display cells prepared by the microcup technology, as shown in FIG. 1, comprise two electrode plates (10, 11), at least one of which is transparent (10), and a layer of cells (12) enclosed between the two electrodes. The cells are filled with charged pigment or pigment-containing particles dispersed in a colored dielectric solvent and sealed with a sealing layer (13). Not shown in FIG. 1, the sealing layer preferably extends over the partition walls (16) and forms a contiguous layer thereon. The sealed cells are laminated onto the second conductor film (10) optionally with an adhesive layer (14). When a voltage difference is imposed between the two electrodes, the charged particles migrate to one side, such that either the color of the pigment or the color of the solvent is seen through the transparent conductor plate or film (10). In addition, at least one of the two conductor films is patterned. To improve the contrast ratio of the EPD, one of two approaches is typically taken: (a) using microcups of a higher payload (a higher aspect ratio and/or a higher ratio of opening area to total area) or (b) using a blackened conductor film (11) on the non-viewing side. Since no light scattering particles are present in the inactive partition areas (16), the viewer will see the background color through the partition areas in both the "on" and "off" states. The blackened background of such a single layer EPD results in a higher Dmax and contrast ratio, but a lower reflectivity in the Dmin state.

The trade-off between contrast ratio and reflectivity in the Dmin state is eliminated in the staggered two-layer structure depicted in FIGS. 2a and 2b. In the two figures, the display has an upper cell layer (21) and a lower cell layer (22). The cells of the two layers are individually sealed with a sealing layer (23). The two layers are arranged in a staggered fashion and the sealing sides of the two layers face each other. The two-layer structure is sandwiched between a top transparent conductor film (24) and a bottom conductor film (25).

In the "on" state (FIG. 2a), the white particles in both upper and lower layers are attracted to the top of the cells (toward the viewing side). The partition areas (26) of the top layer will appear "white" since light is reflected back by the particles in the lower layer. In contrast, at the "off" state (FIG. 2b), the white particles in both layers are attracted to the bottom of the cells (toward the non-viewing side). The partition areas of the top layer will appear "colored" since light is absorbed by the colored dielectric solvent in the lower layer. As a result, Dmax and contrast ratio of the display may be improved without the trade-off in the reflectivity in the Dmin state.

The two-layer or multilayer EPD also allows the use of a cell with a lower payload (a lower aspect ratio and a lower ratio of opening area to total area) to achieve a high contrast ratio with a higher reflectivity at the Dmin state. This significantly improves the release properties of the embossing process and reduces the cost and degree of difficulty in the mold making process.

FIGS. 3a and 3b show a two-layer color electrophoretic display wherein the top layer (31) comprises display cells filled with red, green and blue electrophoretic fluids and the bottom layer (32) comprises display cells filled with a black electrophoretic fluid. In both figures, the inactive partition areas (36) of the upper layer (31) are staggered with the active cell areas of the lower layer (32). The two-layer structure is sandwiched between two conductor films (34) and (35). At least one of the two conductor films is transparent.

FIGS. 4a and 4b show a two-layer full-color electrophoretic display wherein the top layer (41) comprises display cells filled with red, green and blue electrophoretic fluids and the bottom layer (42) comprises display cells filled with red, green, blue and black electrophoretic fluids. The colored cells and the inactive partition areas (46) of the two layers are arranged in a staggered manner so that the red, green, blue and inactive partition areas of the top layer (41) are overlapped with registration to the red, green, blue and black microcups of the bottom layer (42), respectively. The two layer structure is sandwiched between two conductor films (44) and (45). At least one of the two conductor films is transparent.

In the two-layer structure, the top microcup layer may be laminated onto the bottom layer at an appropriate angle to avoid formation of the undesirable Moire pattern. Alternatively, a less symmetrical microcup array may be used for similar purpose.

The pigment or pigment-containing particles or the colorant particles may also be magnetic. In one embodiment, a two-layer electromagnetophoretic display may have a bottom layer comprises display cells which are filled with an electromagnetophoretic fluid comprising a mixture of black magnetic particles and white non-magnetic particles dispersed in a colorless clear solvent or solvent mixture. The top layer may comprise red, green and blue cells which are filled with electrophoretic fluids comprising white particles dispersed in red, green and blue solvents, respectively. Alternatively, the top layer may comprise display cells which are filled with an electrophoretic fluid comprising a mixture of white and black particles dispersed in a colorless clear solvent or solvent mixture.

Details of the electromagnetophoretic display layer are disclosed in pending applications, U.S. Ser. No. 60/367,325 filed on Mar. 21, 2002 and U.S. Ser. No. 60/375,299 filed on Apr. 23, 2002, the contents of which are incorporated herein in their entirety by reference.

In general, the cell gap or the shortest distance between the two electrodes in a multilayer display may be in the range of 15 to 200 µm, preferably in the range of 20 to 50 µm. The thickness of each display cell layer may vary. In one embodiment, it may be in the range of 10 to 100 µm, preferably in the range of 12 to 30 µm. The concentration of particles and dyes or colorants in each display cell layer may also vary for different applications.

III. Preparation of the Microcup Array

The microcup-based display cells may be prepared by either microembossing, photolithography or pre-punched holes as taught in copending patent applications, U.S. Ser. No. 09/518,488 filed on Mar. 3, 2000 (corresponding to WO 01/67170), U.S. Ser. No. 09/942,532 filed on Aug. 29, 2001 (US Publication No. 2002-75556 published on Jun. 20, 2002), U.S. Ser. No. 09/759,212 filed on Jan. 11, 2001 (corresponding to WO 02/56097), U.S. Ser. No. 09/606,654 filed on Jun. 28, 2000 (corresponding to WO 02/01281) and U.S. Ser. No. 09/784,972 filed on Feb. 15, 2001 (corresponding to WO 02/65215), all of which are incorporated herein by reference.

In general, the microcup-based cells can be of any shape, and their sizes and shapes may vary. The cells may be of substantially uniform size and shape in one system. However, in order to maximize the optical effect, cells having a mixture of different shapes and sizes may be produced. For example, cells filled with a dispersion of the red color may have a different shape or size from the green cells or the blue cells. Furthermore, a pixel may consist of different numbers of cells of different colors. For example, a pixel may consist of a number of small green cells, a number of large red cells and a number of small blue cells. It is not necessary to have the same shape and number for the three colors.

The openings of the microcups may be circular, square, rectangular, hexagonal or any other shape. The partition areas between the openings are preferably kept small in order to achieve high color saturation and contrast ratio while maintaining desirable mechanical properties. Consequently, the honeycomb-shaped opening is preferred over, for example, the circular opening.

For reflective electrophoretic displays, the dimension of each individual microcup may be in the range of about $10^2$ to about $10^6$ µm$^2$, preferably about $10^3$ to about $10^5$ µm$^2$. The depth of the microcups may be in the range of about 3 to about 200 µm, preferably about 10 to about 50 µm. The ratio of opening area to total area may be in the range of about 0.1 to about 0.95, preferably about 0.4 to about 0.90. The width of the partition between microcups may be in the range of about 2 to about 200 µm, preferably about 5 to about 20 µm.

Figure 6A:
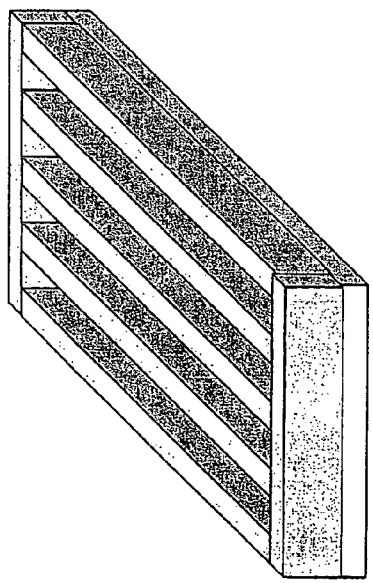
FIGS. 6a, 6b, and 6c show three alternative partition type cell structures.
Figure 6B:
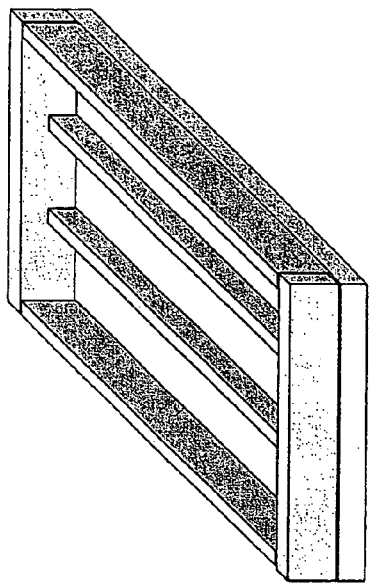

In the case of groove or channel type of display cells as shown in FIG. 6a and 6b, the length of the groove may be in the range of about 10 µm to about 90 inches, preferably in the range of about 60 µm to about 40 inches. The width of the groove or channel opening may be in the range of about 10 to about 500 µm, preferably in the range of about 40 to about 200 µm. The width of the groove or channel partition wall may be in the range of about 2 to about 500 µm, preferably about 5 to about 50 µm. For the groove type cells, an edge seal adhesive may be applied to the first block at both ends (in the longitudinal direction) of the grooves. The groove type cells are also useful for multicolor applications.

Figure 6C:
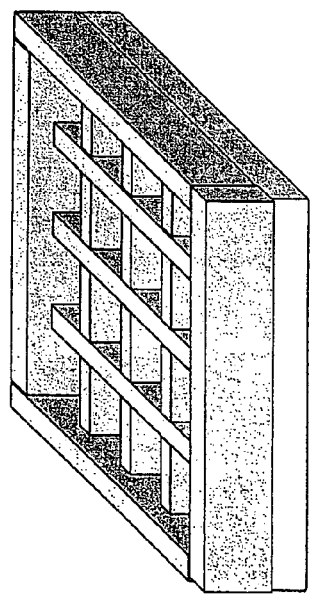

In the case of the grid type of display cells as shown in FIG. 6c, the length and width of the grid opening may be in the range of about 10 to about 300 µm, preferably in the range of about 40 to about 100 µm. The width of the grid partition wall may be in the range of about 2 to about 500 µm, preferably about 5 to about 50 µm.

IV. The Sealing Composition and Process

After the microcups are filled with a display fluid (e.g., an electrophoretic display fluid or a liquid crystal composition), the filled microcups are sealed with a sealing composition comprising the following ingredients:

(1) a solvent or solvent mixture which is immiscible with the display fluid in the microcups and exhibits a specific gravity no greater than that of the display fluid; and (2) a thermoplastic elastomer.

Compositions comprising a thermoplastic elastomer having good compatibility with the microcup material and good barrier properties against the display fluid are useful. Examples of thermoplastic elastomers include ABA, and (AB)n type of di-block, tri-block and multi-block copolymers wherein A is styrene, α-methylstyrene, ethylene, propylene or norbornene; B is butadiene, isoprene, ethylene, propylene, butylene, dimethylsiloxane or propylene sulfide; and A and B cannot be the same in the formula. The number, n, is $\geq 1$, preferably 1–10. In one embodiment, the thermoplastic elastomers may include di-block or tri-block copolymers of styrene and α-methylstyrene such as SB (poly (styrene-b-butadiene)), SBS (poly(styrene-b-butadiene-b-styrene)), SIS (poly(styrene-b-isoprene-b-styrene)), SEBS (poly(styrene-b-ethylene/butylene-b-styrene)), poly(styrene-b-dimethylsiloxane-b-styrene), poly(α-methylstyrene-b-isoprene), poly(α-methylstyrene-b-isoprene-b-α-methylstyrene), poly(α-methylstyrene-b-propylene sulfide-b-α-methylstyrene) or poly(α-methylstyrene-b-dimethylsiloxane-b-α-methylstyrene). A review of the preparation of the thermoplastic elastomers can be found in N. R. Legge, G. Holden, and H. E. Schroeder ed., "Thermoplastic Elastomers", Hanser Publisher (1987). In one embodiment, commercially available styrene block copolymers such as Kraton D and G series (from Kraton Polymer, Houston, Tex.) are used.

Polyurethane thermoplastic elastomers and crystalline rubbers such as polyether polyurethanes, polyester polyurethanes, polybutadiene polyurethanes, polysiloxane polyurethanes or poly(ethylene-co-propylene-co-5-methylene-2-norbornene) or EPDM (ethylene-propylene-diene terpolymer) rubbers such as Vistalon 6505 (from Exxon Mobil, Houston, Tex.) or their grafted copolymers have also been found useful.

The sealing composition significantly enhances the modulus and film integrity of the sealing layer throughout the coating and drying processes of the sealing layer. Thermoplastic elastomers having low critical surface tension (e.g., lower than 40 dyne/cm) and high modulus or Shore A hardness (e.g., higher than 60) have been found useful probably because of their favorable wetting property and film integrity over the display fluid.

The thermoplastic elastomer is dissolved in a solvent or solvent mixture which is immiscible with the display fluid in the microcups and exhibits a specific gravity no greater than that of the display fluid. Low surface tension solvents are used because of their better wetting properties over the microcup walls and the electrophoretic fluid. In one embodiment, the solvents or solvent mixtures may have a surface tension lower than 40 dyne/cm. In another embodiment, the solvent or solvent mixtures may have a surface tension of lower than 35 dyne/cm.

Suitable solvents include alkanes (including $C_{6-12}$ alkanes such as heptane, octane or Isopar solvents from Exxon Chemical Company, nonane, decane or their isomers), cycloalkanes (including $C_{6-12}$ cycloalkanes such as cyclohexane and decalin or the like), alkylbezenes (including mono- or di-$C_{1-6}$ alkyl benzenes such as toluene, xylene or the like), alkyl esters (including $C_{2-5}$ alkyl esters such as ethyl acetate, propyl acetate, isobutyl acetate or the like), ketones (including $C_{3-7}$ ketones such as methyl ethyl ketone, methyl propyl ketone, methyl butyl ketone, cyclohexanone or the like) or $C_{3-5}$ alkyl alcohols (including isopropanol, butanol or the like). Mixtures of an alkylbenzene and an alkane are useful for hydrocarbon elastomers.

Cosolvents and wetting agents (such as the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives and Silwet silicone surfactants from OSi, Greenwich, Conn.) may also be included in the composition to improve the adhesion of the sealant to the microcups and provide a wider coating process latitude. Other ingredients including crosslinking agents (e.g., bisazides such as 4,4'-diazidodiphenylmethane and 2,6-di-(4'-azidobenzal)-4-methylcyclohexanone), vulcanizers (e.g., 2-benzothiazolyl disulfide and tetramethylthiuram disulfide), multifunctional monomers or oligomers (e.g., hexanediol, diacrylates, trimethylolpropane, triacrylate, divinylbenzene, diallylnaphthalene), thermal initiators (e.g., dilauroyl peroxide, benzoyl peroxide) and photoinitiators (e.g., isopropyl thioxanthone (ITX), Irgacure 651 and Irgacure 369 from Ciba-Geigy) are also highly useful to enhance the physicomechanical properties of the sealing layer by crosslinking or polymerization reactions during or after the sealing process. The sealing compositon may also comprise a thermoplastic material that is compatible with one of the blocks of the thermoplastic elastomer. Examples of such thermoplastic materials include polystyrene and poly(α-methylstyrene).

In the two-pass method, the sealing composition is typically overcoated onto partially filled microcups. Alternatively, the sealing composition may be predispersed in the electrophoretic fluid and filled in the microcups to form a seamless sealing layer by the one-pass process. In the one-pass process, the sealing composition may be predispersed by in-line blending into the electrophoretic fluid immediately before being filled into the microcups.

The sealed microcups optionally may be post treated by UV radiation or thermal baking to further improve the barrier properties. The adhesion of the sealing layer to the microcups may also be improved by the post-curing reaction, likely due to the formation of an interpenetration network at the microcup-sealing layer inter-phase.

V. Preparation of a Single Layer Display

The process can be a continuous roll-to-roll process as disclosed in WO 01/67170. It may comprise the following steps:

1. Coat a layer of an embossable composition comprising a thermoplastic, thermoset or a precursor thereof optionally with a solvent, on a conductor plate or film. The solvent, if present, readily evaporates.

2. Emboss the embossable layer at a temperature higher than the glass transition temperature of the thermoplastic or thermoset precursor layer by a pre-patterned male mold.

3. Release the mold from the embossable layer preferably during or after it is hardened by proper means.

4. Fill the microcups with an electrophoretic fluid or a liquid crystal composition and seal the filled microcups with a sealing composition as described above by either the one-pass or two-pass overcoating process.

5. Laminate the sealed array of electrophoretic cells with a second conductor plate or film, optionally with an adhesive layer which may be a pressure sensitive adhesive, a hot melt adhesive, a heat, moisture or radiation curable adhesive.

The laminate adhesive may be post cured by radiation such as UV through the top conductor film if the latter is transparent to the radiation. The finished product may be cut to various size and shape after the lamination step.

The preparation of the microcups described above can be conveniently replaced by the alternative procedure of photolithography as disclosed in WO 01/67170 or the pre-punched holes as disclosed in US Patent Publication No. 2002-75556. A full color EPDs may be prepared by sequentially filling red, green and blue electrophoretic fluids into the microcups and subsequently sealing the filled microcups by the one-pass or two-pass sealing method.

VI. Electrophoretic Display Having Multiple Layers of Display Panel and its Manufacture FIGS. 5a and 5b show the methods for the manufacture of an electrophoretic display having two or more layers of display cells.

Figure 5A:
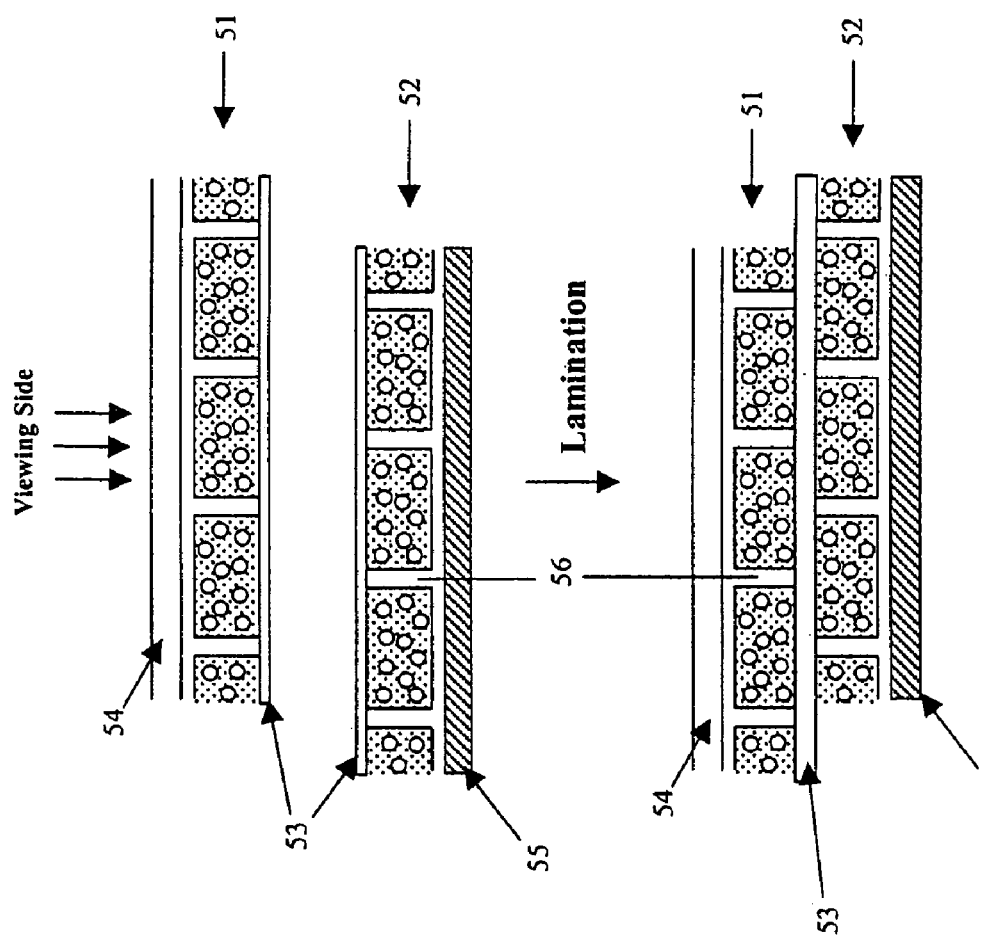
FIGS. 5a and 5b show the methods for the manufacture of an electrophoretic display having two or more layers of display cells.

FIG. 5a shows the process of preparing a two-layer electrophoretic display by laminating a top layer (51) and a bottom layer (52) of display cells prepared by, for example, the procedure described in the steps 1–4 in Section V. The filled display cells are individually sealed with a sealing layer (53). The sealing layer is formed from a composition as described in Section IV above. The conductor film (54) on the viewing side is transparent and the conductor film (55) on the non-viewing side may be blackened or colored. An adhesive layer may be used to facilitate the lamination process. The two layers (51 and 52) are arranged with the inactive partition areas (56) of one layer and the active cell areas of another layer in a staggered fashion.

Figure 5B:
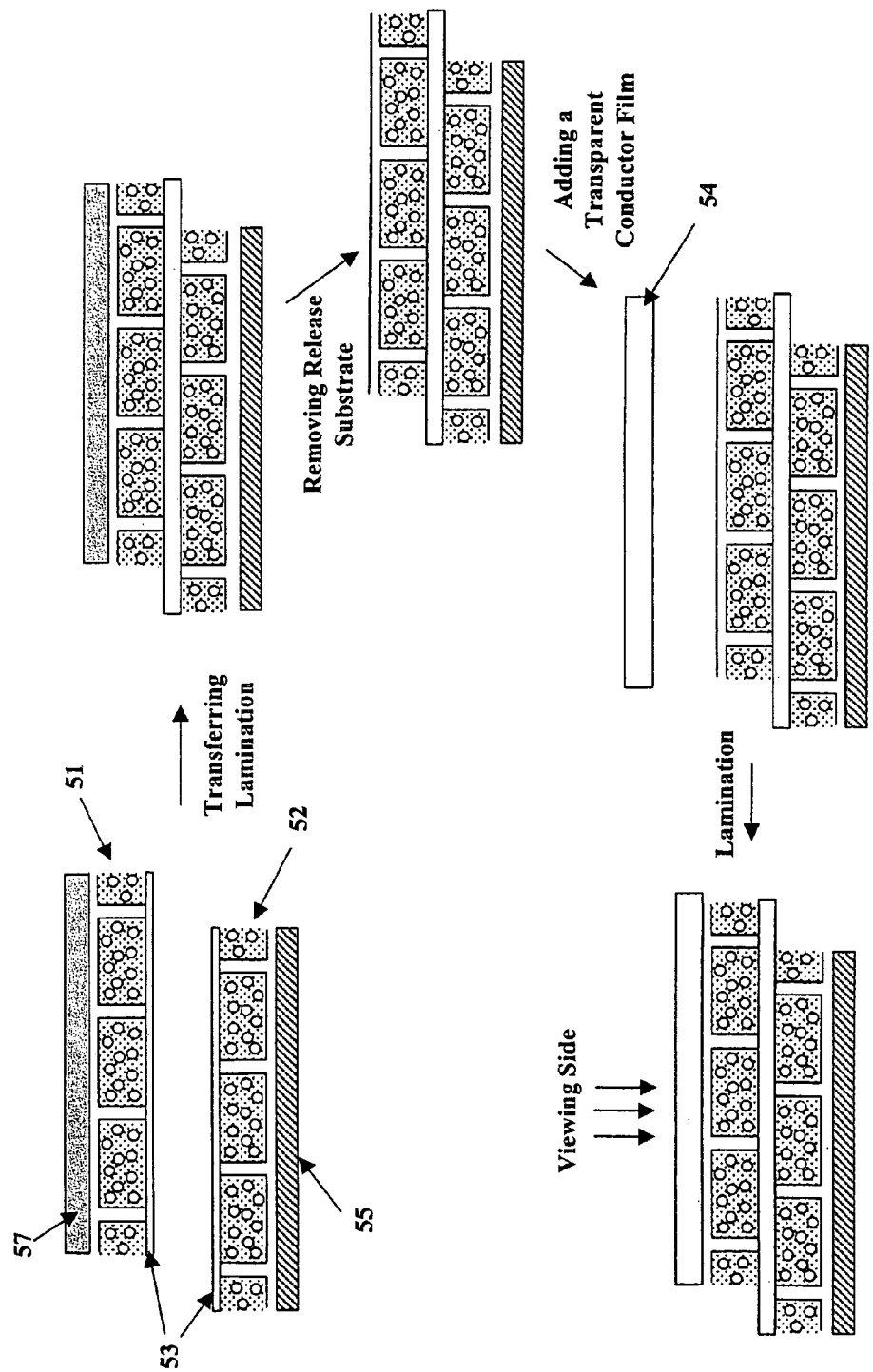

FIG. 5b shows another process of preparing a two layer electrophoretic display by (i) preparing a layer of display cells (52) on a conductor film (55) by, for example, the procedure described in the steps 1–4 in Section V; (ii)

preparing another layer of display cells (51) on a release substrate (57) by the same procedure in (i); (iii) laminating the layer of display cells (51) on the release substrate (57) onto the layer (52), optionally with an adhesive (not shown); (iv) removing the release substrate and (v) laminating the resultant composite film onto a conductor film (54), optionally with an adhesive (not shown). The steps (ii), (iii), and (iv) may be repeated to prepare an electrophoretic display having more than two layers of display cells.

In the two-layer or multilayer electrophoretic display as prepared above, it is important that the inactive-partition areas of the upper microcup layer are arranged with the active microcup areas of the lower layer in a staggered manner. At least one of the two conductor films (54 and 55) is pre-patterned. Also at least the conductor film (54) on the viewing side is transparent.

EXAMPLES

Example 1

Microcup Formulation

35 Parts by weight of Ebecryl 600 (UCB), 40 parts of SR-399 (Sartomer), 10 parts of Ebecryl 4827 (UCB), 7 parts of Ebecryl 1360 (UCB), 8 parts of HDDA, (UCB), 0.05 parts of Irgacure 369 (Ciba Specialty Chemicals) and 0.01 parts of isopropyl thioxanthone (ITX from Aldrich) were mixed homogeneously and used for microembossing.

Example 2

Preparation of Microcup Array

A primer solution comprising of 5 parts of Ebecryl 830, 2.6 parts of SR-399 (from Sartomer), 1.8 parts of Ebecryl 1701, 1 part of PMMA (Mw=350,000 from Aldrich), 0.5 parts of Irgacure 500 and 40 parts of methyl ethyl ketone (MEK) was coated onto a 2 mil 60 ohm/sq. ITO/PET film (from Sheldahl Inc., Minn.) using a #3 Myrad bar, dried and UV cured by using the Zeta 7410 (5 w/cm$^2$, from Loctite) exposure unit for 15 minutes in air. The microcup formulation prepared in Example 1 was coated onto the treated ITO/PET film with a targeted thickness of about 50 μm, embossed with a Ni—Co male mold having a 60 (length)× 60 (width) μm repetitive protrusion square pattern with 25–50 μm protrusion height and 10 μm wide partition lines, UV cured from the PET side for 20 seconds and removed from the mold with a 2" peeling bar at a speed of about 4–5 ft/min. Well-defined microcups with depth ranging from 25 to 50 μm were prepared by using male molds having corresponding protrusion heights. Microcup arrays of various dimension such as 70 (length)×70 (width)×35 (depth)× 10 (partition), 100 (L)×100 (W)×35(D)×10 (P), and 100 (L)×100(W)×30(D)×10(P) μm were also prepared by the same procedure.

Example 3

Pigment Dispersion 6.42 Grams of Ti Pure R706 were dispersed with a homogenizer into a solution containing 1.94 grams of Fluo rolink D from Ausimont, 0.22 grams of Fluorolink 7004 also from Ausimont, 0.37 grams of a fluorinated copper phthalocyanine dye from 3M and 52.54 grams of perfluoro solvent HT-200 (Ausimont).

Example 4

Pigment Dispersion

The procedure of Example 3 was followed, except that the Ti Pure R706 and Fluorolink were replaced by a polymer coated $TiO_2$ particles PC-9003 from Elimentis (Highstown, N.J.) and Krytox (Du Pont), respectively.

Example 5

Microcup Sealing

The electrophoretic fluid prepared in Example 3 was diluted with a volatile perfluoro co-solvent FC-33 from 3M and coated onto a 35 microns deep microcup array prepared in Example 2. The volatile cosolvent was allowed to evaporate to expose a partially filled microcup array. A 7.5% solution of polyisoprene (97% cis, from Aldrich) in heptane was then overcoated onto the partially filled cups by a Universal Blade Applicator with an opening of 3 mil. The overcoated microcups were then dried at room temperature. A seamless sealing layer of about 7–8 μm thickness (dry) with acceptable adhesion and uniformity was formed on the microcup array. No observable entrapped air bubble in the sealed microcups was found under microscope. A second ITO/PET conductor precoated with an adhesive layer was laminated onto the sealed microcups. The electrophoretic cell showed satisfactory switching performance with good flexure resistance. No observable weight loss was found after being aged in a 66° C. oven for 5 days.

Example 6

Microcup Sealing

The procedure of Example 5 was followed, except that the thickness of the polyisoprene layer was reduced to 4 microns by using a blade applicator of 2 mil opening. Pinholes and broken sealing layer were clearly observed under optical microscope.

Examples 7–14

Microcup Sealing

The procedure of Example 5 was followed, except that the sealing layer was replaced by polyisoprene, polystyrene, polyvinylbutyral (Butvar 72, from Solutia Inc., St. Louis, Mo.) and thermoplastic elastomers such as SIS (Kraton D 1107, 15% styrene), SBS (Kraton D1101, 31% styrene) SEBS (Kraton G1650 and FG1901, 30% styrene) and EPDM (Vistalon 6505, 57% ethylene), respectively. The results are summarized in Table 1. As it can be seen from Table 1, thermoplastic elastomers enabled thinner and higher quality sealing even on microcups of wide openings.

TABLE 1

Sealing of microcups

| Example No. | Sealing Polymer | Coating solution | Estimated dry thickness | Cup dimension (L × W × D × P), um | Coating quality (visual) | Coating quality (Microscopic) |
|---|---|---|---|---|---|---|
| comparative 5 | Polyisoprene (97% cis) | 7.5% in heptane | 4–5 um | 60 × 60 × 35 × 10 | Fair | pinholes, broken layer |
| comparative 6 | Polyisoprene (97% cis) | 7.5% in heptane | 7–8 um | 60 × 60 × 35 × 10 | good | good |
| comparative 7 | Polystyrene | 30% in toluene | 7–8 um | 60 × 60 × 35 × 10 | very poor, severe dewetting | incomplete sealing, defects |
| comparative 8 | Butvar 72 | 8.5% in isopropanol | 4–5 um | 60 × 60 × 35 × 10 | poor reproducibility | fair |
| 9 | SIS (Kraton D1107); 15% Styrene | 4% in Heptane | 4–5 um | 70 × 70 × 35 × 10 | good | good |
| 10 | SIS (Kraton D1107); 15% Styrene | 4% in Heptane | 3–4 um | 100 × 100 × 30 × 10 | good | good |
| 11 | SBS (Kraton D1107); 31% Styrene | 10% in toluene/ heptane (20/80) | 4–5 um | 70 × 70 × 35 × 10 | good | good |
| 12 | SEBS (Kraton FG-1901, 30% styrene, 1.5% maleic anhydride) | 10% in xylene/ Isopar E (5/95) | 4–5 um | 70 × 70 × 35 × 10 | good | good |
| 13 | SEBS (Kraton G1650, 30% styrene) | 5% in toluene/ heptane (5/95) | 4–5 um | 70 × 70 × 35 × 10 | good | good |
| 14 | EPDM (Vistalon 6505, 57% ethylene) | 10% in Isopar E | 4–5 um | 70 × 70 × 35 × 10 | good | good |

Preparation 1

Synthesis of a Multifunctional Reactive Protective Colloid $R_f$-amine

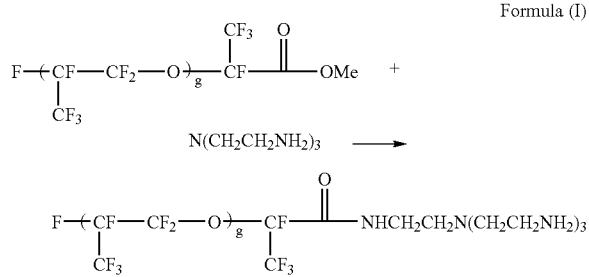

Formula (I)

17.8 Gm of Krytox® methyl ester (DuPont, 17.8 g, MW=about ~1780, g=about 10, DuPont) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping at 100° C. for 4–6 hours. The crude product was then dissolved in 50 ml of PFS2 solvent (low m.w. perfluoropolyether from Ausimont) and extracted with 20 ml of ethyl acetate three times, then dried to yield 17 gm of purified product ($R_f$-amine1900) which showed excellent solubility in HT200. The product ($R_f$-amine1780) showed good solubility in HT200.

Other reactive multifunctional $R_f$-amines of Formula (I) having different molecular weights such as $R_f$-amine4900 (g=about 30), $R_f$-amine2000 (g=about 11), $R_f$-amine800 (g=about 4) and $R_f$-amine650 (g=about 3) were also synthesized according to the same procedure.

Preparation 2

Preparation of $TiO_2$-Containing Microparticles 9.05 Gm of Desmodur® N3400 aliphatic polyisocyanate (from Bayer AG) and 0.49 gm of triethanolamine (99%, Dow) were dissolved in 3.79 gm of MEK. To the resultant solution, 13 gm of $TiO_2$ R706 (DuPont) was added and homogenized for 2 minutes with a rotor-stator homogenizer (IKA ULTRA-TURRAX T25, IKA WORKS) at ambient temperature. A solution containing 1.67 gm of 1,5-pentanediol (BASF), 1.35 gm of polypropylene oxide (m.w.=725, from Aldrich), 2.47 gm of MEK and 0.32 gm of a 2% dibutyltin dilaurate (Aldrich) solution in MEK was added and further homogenized for 2 minutes. In the final step, 0.9 gm of $R_f$-amine 4900 prepared from Preparation 1 in 40.0 gm of HT-200 (Ausimont) was added and homogenized for 2 minutes, followed by addition of additional 0.9 gm of $R_f$-amine 4900 in 33.0 gm of HT-200 and homogenization for 2 minutes. A low viscosity microcapsule dispersion was obtained.

The microcapsule dispersion obtained was heated at 80° C. overnight and stirred under low shear to post-cure the particles. The resultant microcapsule dispersion was filtered through a 400-mesh (38 micrometer) screen. The particle and the solid content of the filtered dispersion was measured to be 29 wt % by weight with an IR-200 Moisture Analyzer (Denver Instrument Company). The average particle size of the filtered dispersion was measured with a Beckman Coulter LS230 Particle Analyzer to be about 2 μm.

An EPD fluid containing 1.0 wt % by weight of CuPc-$C_8F_{17}$ (structure given below) and various amount of the resultant TiO$_2$-containing microcapsule dispersion in HT-200 was filled into the microcups which were then sealed and sandwiched between two ITO/PET films according to the procedure described in Preparation 3.

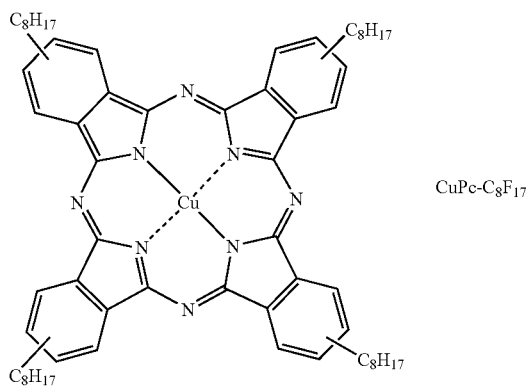

CuPc-$C_8F_{17}$

Preparation 3A

Primer Coated Transparent Conductor Film

A primer coating solution containing 33.2 gm of EB 600™ (UCB, Smyrna, Ga.), 16.12 gm of SR 399™ (Sartomer, Exton, Pa.), 16.12 gm of TMPTA (UCB, Smyrna, Ga.), 20.61 gm of HDODA (UCB, Smyrna, Ga.), 2 gm of Irgacure™ 369 (Ciba, Tarrytown, N.Y.), 0.1 gm of Irganox™ 1035 (Ciba), 44.35 gm of poly(ethyl methacrylate) (MW. 515,000, Aldrich, Milwaukee, Wis.) and 399.15 gm of MEK (methyl ethyl ketone) was mixed thoroughly and coated onto a 5 mil transparent conductor film (ITO/PET film, 5 mil OC50 from CPFilms, Martinsville, Va.) using a #4 drawdown bar. The coated ITO film was dried in an oven at 65° C. for 10 minutes and exposed to 1.8 J/cm$^2$ of UV light under nitrogen using a UV conveyer (DDU, Los Angles, Calif.).

TABLE 2

Preparation 3B
Preparation of Microcups
Microcup Composition

| Component | Weight Part | Source |
|---|---|---|
| EB 600 | 33.15 | UCB |
| SR 399 | 32.24 | Sartomer |
| HDDA | 20.61 | UCB |
| EB1360 | 6.00 | UCB |
| Hycar X43 | 8.00 | B F Goodrich |
| Irgacure 369 | 0.20 | Ciba |

TABLE 2-continued

Preparation 3B
Preparation of Microcups
Microcup Composition

| Component | Weight Part | Source |
|---|---|---|
| ITX | 0.04 | Aldrich |
| Antioxidant Ir1035 | 0.10 | Ciba |

33.15 Gm of EB 600™ (UCB, Smyrna, Ga.), 32.24 gm of SR 399™ (Sartomer, Exton, Pa.), 6 gm of EB1360™ (UCB, Smyrna, Ga.), 8 gm of Hycar 1300×43 (reactive liquid polymer, Noveon Inc. Cleveland, Ohio), 0.2 gm of Irgacure™ 369 (Ciba, Tarrytown, N.Y.), 0.04 gm of ITX (Isopropyl-9H-thioxanthen-9-one, Aldrich, Milwaukee, Wis.), 0.1 gm of irganox™ 1035 (Ciba, Tarrytown, N.Y.) and 20.61 gm of HDDA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 4"×4" electroformed Ni male mold for an array of 100 μm (length)×100 μm (width)×25 μm (depth)×15 μm (width of top surface of the partition wall between cups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 3A, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 mJ/cm$^2$ was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 J/cm$^2$.

Preparation 3C

Filling and Sealing with a Sealing Composition

An electrophoretic fluid containing 9.7% by weight (dry weight) of the TiO$_2$-containing microcapsules prepared according to the Preparation 2, 1.0% by weight of CuPc-$C_8F_{17}$ and 0.5% by weight of R$_f$-amine2000 (based on the total dry weight of the TiO2-containing microcapsule) prepared according to Preparation 1 in HT-200 was filled into the 4"×4" microcup array prepared from Preparation 3B using a #0 drawdown bar. The excess of fluid was scraped away by a rubber blade.

A sealing composition containing 14% by weight of polyurethane IROSTIC P9815-20 (from Huntsman Polyurethane) in MEK/IPAc/CHO (47.5/47.5/5) was overcoated onto the filled microcups using a Universal Blade Applicator and dried at room temperature to form a seamless sealing layer of about 2–3 μm dry thickness with good uniformity. The lamination of the electrode layer over the sealed microcups was accomplished by pressing the ITO side of an ITO/PET film (5 mil) onto the sealing layer by a laminator at 120° C. and at the speed of 20 cm/min.

Comparative Example 15

Single Layer Microcup EPD

The resultant single layer microcup EPD prepared according to the Preparation 3C was then coated with a thin layer of black coating on the outer surface of the electrode on the sealing side of the display (the non-viewing side). The electrode film on the side opposite to the sealing layer is the viewing side from which all the electro-optic performances were measured. The test results including contrast ratio and Dmin at various normalized field strength are listed in Table 3.

Example 16

Staggered Two-Layer Microcup EPD

An electrophoretic fluid containing 6.0% by weight (dry weight) of the $TiO_2$-containing microcapsules prepared according to Preparation 2, 1.0 wt % by weight of CuPc-$C_8F_{17}$ and 0.5% by weight (based on the total dry weight of the $TiO_2$-containing microparticles) of $R_f$-amine2000 (from Preparation 1) in HT200 was filled and sealed into a microcup array prepared in Preparation 3C (the lower layer). The sealed microcup layer was laminated to a second sealed microcup layer (the upper layer) prepared in the Comparative Example 15 to form a staggered two-layer EPD film in which the inactive partition areas of the upper microcup layer were arranged in a staggered manner with registration to the active microcup areas of the lower layer. The resultant two-layer EPD film was evaluated as in the Comparative Example 15. The contrast ratio and Dmin at various normalized field strength measured from the upper layer side are also summarized in Table 3.

Example 17

Staggered Two-Layer Microcup EPD

The same procedure of Example 16 was followed except that the upper microcup layer was filled with an electrophoretic fluid containing 9.7% by weight (dry weight) of $TiO_2$-containing microparticles from Preparation 2, 1.0% by weight of CuPc-$C_8F_{17}$ and 0.5% by weight (based upon the total dry weight of the $TiO_2$-containing microparticles) of $R_f$-amine2000 in HT200; and the lower microcup layer was filled with 9.7% by weight of the $TiO_2$-containing microparticles, 1.5% by weight of CuPc-$C_8F_{17}$ and 0.5% by weight (based upon the total dry weight of the $TiO_2$-containing microparticles) of $R_f$-amine 2000 in HT200. The contrast ratio and Dmin at various normalized field strength are summarized in Table 3. The contrast ratio and Dmin were shown to have been further improved by the increases in dye and particle concentrations in the lower layer.

Example 18

Staggered Two-Layer Microcup EPD

The same procedure of Example 16 was followed, except that the electrophoretic fluid of the upper microcup layer contained 9.7% by weight of the $TiO_2$-containing microparticles from Preparation 2, 0.7% by weight of CuPc-$C_8F_{17}$ and 0.5% by weight (based upon the total dry weight of the $TiO_2$-containing microparticles) of $R_f$-amine2000 in HT200; and the lower microcup layer contained 9.7% by weight of the $TiO_2$-containing microparticles, 1.5% by weight of CuPc-$C_8F_{17}$ and 0.5% by weight (based upon the total dry weight of the $TiO_2$-containing microparticles) of $R_f$-amine2000 in HT200. The contrast ratio and Dmin at various normalized field strength are summarized in Table 3.

TABLE 3

Contrast Ratios and Dmin of Examples 15–18

| | Upper Layer | | Lower Layer | | | Normalized Field Strength | | | |
|---|---|---|---|---|---|---|---|---|---|
| | wt % CuPc-$C_8F_{17}$ | wt % $TiO_2$ microparticle | wt % CuPc-$C_8F_{17}$ | wt % $TiO_2$ microparticle | | 10 | 20 | 30 | 40 |
| Comparative Example 15 | 1.0 | 9.7 | N.A. | N.A. | Contrast ratio | 2.50 | 9.00 | 9.20 | 9.50 |
| | | | | | Dmin | 0.84 | 0.76 | 0.76 | 0.75 |
| Example 16 | 1.0 | 9.7 | 1.0 | 6.0 | Contrast ratio | 3.50 | 12.30 | 13.50 | 14.00 |
| | | | | | Dmin | 0.76 | 0.69 | 0.69 | 0.68 |
| Example 17 | 1.0 | 9.7 | 1.5 | 9.7 | Contrast ratio | 2.50 | 14.50 | 17.00 | 19.00 |
| | | | | | Dmin | 0.78 | 0.66 | 0.66 | 0.65 |
| Example 18 | 2.0 | 9.7 | 1.5 | 9.7 | Contrast ratio | 5.00 | 8.00 | 9.50 | 9.50 |
| | | | | | Dmin | 0.75 | 0.67 | 0.65 | 0.65 |

It is evident from Table 3 that under the same normalized field strength, all of the two-layer EPDs (Examples 16–18) showed significantly higher contrast ratio and lower Dmin (higher reflectivity in the Dmin state) than the single layer EPD (Comparative Example 15).

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto. For example, it should be noted that the method of the invention for preparing microcups may also be used for preparing microcups for liquid crystal displays. Similarly, the microcup selective filling, sealing and ITO laminating methods of the invention may also be employed in the manufacture of liquid crystal displays. Moreover, both the one-pass and two-pass sealing and filling processes and compositions are also useful to fill and seal electrophoretic displays having the groove type, the grid type as shown in FIGS. 6a, 6b and 6c and other partition type of cell structures.

It is therefore wished that this invention to be defined by the scope of the appended claims as broadly as the prior art will permit, and in view of the specification if need be.

What is claimed is:

1. A display comprising more than one layer of display cells wherein said display cells are filled with a display fluid and sealed with a sealing layer formed from a sealing composition comprising:
   a) a solvent or solvent mixture which is immiscible with the display fluid contained within the display cells, and
   b) a thermoplastic elastomer.

2. The display of claim 1 wherein said solvent has a specific gravity no greater than that of the display fluid.

3. The display of claim 1 wherein said thermoplastic elastomer has a specific gravity no greater than that of the display fluid.

4. The display of claim 1 wherein said solvent or solvent mixture has a surface tension of lower than 40 dyne/cm.

5. The display of claim 1 wherein said solvent or solvent mixture has a surface tension of lower than 35 dyne/cm.

6. The display of claim 1 wherein said solvent or solvent mixture is selected from the group consisting of alkanes, cyclic alkanes, alkylbenzenes, alkyl esters, ketones and alkyl alcohols.

7. The display of claim 6 wherein said solvent is selected from the group consisting of heptane, octane, nonane, cyclohexane, decalin, toluene, xylene and their isomers or mixtures thereof.

8. The display of claim 1 wherein said thermoplastic elastomer is selected from the group consisting of ABA and (AB)n types of di-block, tri-block and multi-block copoliymers, in which:
   A is styrene, α-methylstyrene, ethylene, propylene or norbornene,
   B is butadiene, isoprene, ethylene, propylene, butylene, dimethylsiloxane or propylene sulfide, and A and B are not the same, and
   n is ≧1.

9. The display of claim 8 wherein n is 1–10.

10. The display of claim 8 wherein said thermoplastic elastomer is selected from the group consisting of poly(styrene-b-butadiene), poly(styrene-b-butadiene-b-styrene, poly(styrene-b-isoprene-b-styrene), poly(styrene-b-ethylene/butylenes-b-styrene), poly(styrene-b-dimethylsiloxane-b-styrene), poly(α-methylstyrene-b-isoprene), poly(α-methylstyrene-b-isoprene-b-α-methylstyrene), poly(α-methylstyrene-b-propylene sulfide-b-α-methylstyrene), poly(α-methylstyrene-b-dimethylsiloxane-b-α-methylstyrene) and their grafted co-polymers and derivatives thereof.

11. The display of claim 1 wherein the thermoplastic elastomer is selected from the group consisting of polyester polyurethane, polyether polyurethane, polybutadiene polyurethane, polysiloxane polyurethane, poly(ethylene-co-propylene-co-5-methylene-2-norbornene), ethylene-propylene-diene terpolymer and their grafted co-polymers and derivatives thereof.

12. The display of claim 1 wherein said sealing composition further comprises a thermoplastic material that is compatible with one of the blocks of the thermoplastic elastomer.

13. The display of claim 12 wherein the thermoplastic material is selected from the group consisting of polystyrene and poly(α-methylstyrene).

14. The display of claim 1 wherein said sealing composition further comprises a wetting agent.

15. The display of claim 14 wherein said wetting agent is selected from the group consisting of surfactants, ZONYL fluorosurfactants, fluoroacrylates, fluoromethacrylates, fluoro-substituted long chain alcohols, perfluoro-substituted long chain carboxylic acids, SILWET silicone surfactants and their derivatives.

16. The display of claim 1 wherein said sealing composition further comprises one or more of the following agents: a crosslinking agent, a vulcanizer, a multifunctional monomer or oligomer, a thermal initiator or a photoinitiator.

17. The display of claim 16 wherein said crosslinking agent is a bisazide.

18. The display of claim 17 wherein said bisazide is 4,4'-diazidodiphenylmethane or 2,6-di-(4'-azidobenzal)-4-methylcyclohexanone).

19. The display of claim 1 wherein said display fluid is an electrophoretic display fluid.

20. The display of claim 1 wherein said display fluid comprises a liquid crystal.

21. A process for the manufacture of a display of more than one layer of display cells, which process comprises:
   a) preparing separately two layers of display cell, by:
      (i) preparing the display cells on two separate conductor plates or films;
      (ii) filling the display cells with a display fluid; and
      (iii) sealing said filled display cells with a sealing composition comprising a solvent or solvent mixture which is immiscible with the display fluid contained within the display cells, and a thermoplastic elastomer; and
   b) laminating one of the layers of display cells over the other layer of display cells, optionally with an adhesive layer.

22. The process of claim 21 wherein step (b) is carried out by laminating one layer of display cells over the other layer of display cells with the sealing sides of the two layers facing each other.

23. A process for the preparation of a display of more than one layer of display cells, which process comprises:
   a) forming a first layer of display cells:
      (i) preparing display cells on a conductor plate or film;
      (ii) filling the display cells with a display fluid; and
      (iii) sealing said filled display cells with a sealing composition comprising a solvent or solvent mixture which is immiscible with the display fluid contained within the display cells, and a thermoplastic elastomer;
   b) forming a second layer of display cells on a transfer release layer following the procedure of steps a(i)–a(iii) except that the display cells are formed on a transfer release layer rather than on a conductor plate or film;
   c) laminating said second layer of display cells over said first layer of display cells and removing said transfer release layer;
   d) optionally forming separately additional layers of display cells on transfer release layers following the procedure of step (b);
   e) laminating said additional layers of display cells over the top layer of display cells in a stack of layers of display cells already formed and removing the transfer release layers; and
   f) laminating a second conductor plate or film over the topmost layer of display cells of said stack.

24. The process of claim 23 wherein step (c) is carried out by laminating said second layer of display cells over said first layer of display cells with the sealing sides of the two layers facing each other, followed by removing said transfer release layer.

25. The process of claim 23 wherein step (e) is carried out by laminating said additional layers of display cells over the top layer of display cells in said stack of layers of display cells already formed, with the sealing sides of the additional layers facing the layers underneath, followed by removing said transfer release layers.

26. The process of claim 23 wherein step (f) is carried out by lamination with or without an adhesive layer.

27. The process of claim 21 or 23 wherein said solvent or solvent mixture has a specific gravity no greater than that of the display fluid.

28. The process of claim 21 or 23 wherein said thermoplastic elastomer has a specific gravity no greater than that of the display fluid.

29. The process of claim 21 or 23 wherein said cells are prepared by microembossing.

30. The process of claim 21 or 23 wherein said cells are prepared by photolithography or pre-punched holes.

31. The process of claim 21 or 23 wherein display cells of different layers are prepared by different methods.

32. The process of claim 31 wherein said methods are independently microembossing, photolithography or pre-punched holes.

33. The process of claim 21 or 23 wherein said sealing step further comprises exposing the sealing composition to UV radiation or thermal baking.

34. The process of claim 21 or 23 wherein said solvent or solvent mixture in the sealing composition has a surface tension of lower than 40 dyne/cm.

35. The process of claim 21 or 23 wherein said solvent or solvent mixture has a surface tension of lower than 35 dyne/cm.

36. The process of claim 21 or 23 wherein said solvent or solvent mixture is selected from a the group consisting of alkanes, cyclic alkanes, alkylbenzenes, alkyl esters, ketones and alkyl alcohols.

37. The process of claim 36 wherein said solvent is selected from the group consisting of heptane, octane, nonane, cyclohexane, decalin, toluene, xylene and their isomers or mixtures thereof.

38. The process of claim 21 or 23 wherein said thermoplastic elastomer is selected from a the group consisting of ABA and (AB)n types of di-block, tri-block and multi-block copolymers, in which:
A is styrene, α-methylstyrene, ethylene, propylene or norbornene,
B is butadiene, isoprene, ethylene, propylene, butylene, dimethylsiloxane or propylene sulfide, and A and B are not the same, and
n is $\geq 1$.

39. The process of claim 38 wherein n is 1–10.

40. The process of claim 21 or 23 wherein said thermoplastic elastomer is selected from the group consisting of poly(styrene-b-butadiene), poly(styrene-b-butadiene-b-styrene), poly(styrene-b-isoprene-b-styrene), poly(styrene-b-ethylene/butylenes-b-styrene), poly(styrene-b-dimethylsiloxane-b-styrene), poly(α-methylstyrene-b-isoprene), poly(α-methylstyrene-b-isoprene-b-α-methylstyrene), poly(α-methylstyrene-b-propylene sulfide-b-α-methylstyrene), poly(α-methylstyrene-b-dimethylsiloxane-b-α-methylstyrene), and their grafted co-polymers and derivatives thereof.

41. The process of claim 21 or 23 wherein the thermoplastic elastomer is selected from the group consisting of polyester polyurethane, polyether polyurethane, polybutadiene polyurethane, polysiloxane polyurethane, poly(ethylene-co-propylene-co-5-methylene-2-norbornene), ethylene-propylene-diene terpolymer and their grafted co-polymers and derivatives thereof.

42. The process of claim 21 or 23 wherein said sealing composition further comprises a thermoplastic material that is compatible with one of blocks of the thermoplastic elastomer.

43. The process of claim 42 wherein the thermoplastic material is selected from the group consisting of polystyrene and poly(α-methylstyrene).

44. The process of claim 19 or 23 wherein said sealing composition further comprises a wetting agent.

45. The process of claim 44 wherein said wetting agent is selected from the group consisting of surfactants, ZONYL fluorosurfactants, fluoroacrylates, fluoromethacrylates, fluoro-substituted long chain alcohols, perfluoro-substituted long chain carboxylic acids, SILWET silicone surfactants and their derivatives.

46. The process of claim 21 or 23 wherein said sealing composition further comprises one or more of the following agents: a crosslinking agent, a vulcanizer, a multifunctional monomer or oligomer, a thermal initiator or a photoinitiator.

47. The process of claim 46 wherein said crosslinking agent is a bisazide.

48. The display of claim 1 wherein said display cell is of the groove or channel type.

49. The display of claim 48 wherein the groove or channel type cell has a length in the range of about 10 μm to about 90 inches, a width of the groove or channel opening in the range of about 10 to about 500 μm and a width of the groove or channel partition wall in the range of about 2 to about 500 μm.

50. The display of claim 48 wherein the groove or channel type cell has a length in the range of about 60 μm to about 40 inches, a width of the groove opening in the range of about 40 to about 200 μm and a width of the groove partition wall in the range of from about 5 to about 50 μm.

51. The display of claim 1 wherein said display cell is of the grid type.

52. The display of claim 51 wherein said grid type cell has a length and a width of the grid opining in the range of about 10 to about 300 μm and a width of the partition wail in the range of about 2 to about 500 μm.

53. The display of claim 51 wherein said grid type cell has a length and a width of the grid opening in the range of about 40 to about 100 μm and a width of the partition wail in the range of about 5 to about 50 μm.

54. The display of claim 16 wherein said vulcanizer is a disulfide.

55. The display of claim 54 wherein said disulfide is 2-benzothiazolyl disulfide or tetramethylthiuram disulfide.

56. The display of claim 46 wherein said vulcanizer is a disulfide.

* * * * *